United States Patent [19]

Ivey

[11] 3,995,727
[45] Dec. 7, 1976

[54] AUTOMATIC LUBRICANT FLOW INCREASE VALVE

[75] Inventor: John Saxon Ivey, Bloomfield Hills, Mich.

[73] Assignee: Borg-Warner Corporation, Chicago, Ill.

[22] Filed: July 14, 1975

[21] Appl. No.: 595,905

[52] U.S. Cl. .............................. 192/113 B; 74/467
[51] Int. Cl.² ........................................ F16D 13/72
[58] Field of Search ................... 192/113 B, 70.12; 74/467

[56] References Cited

UNITED STATES PATENTS

| | | | |
|---|---|---|---|
| 2,833,385 | 5/1958 | Peterson et al. | 192/113 B |
| 3,017,006 | 1/1962 | Dence et al. | 192/113 B |
| 3,301,367 | 1/1967 | Yokel | 192/113 B |
| 3,651,904 | 3/1972 | Snoy et al. | 192/113 B |

Primary Examiner—Benjamin W. Wyche
Attorney, Agent, or Firm—Robert L. Zieg

[57] ABSTRACT

A lubricant valve for use in a control system for an automatic transmission including a shift valve adapted to change ratio in the transmission mechanism by exhausting a first friction device of pressure and engaging a second friction device with pressure. The lubricant valve is connected to the shift valve and to lubricant distributing ports in the device for conducting lubricating oil to the friction plates. The lubricant valve is connected to an exhaust conduit for the first friction device whereby when pressure is exhausted through the exhaust conduit, as initiated by the shift valve when the second friction device is to be engaged, the initial high value of pressure in the exhaust conduit acts on the lubricant valve to move same to a position to connect additional pressure momentarily to the lubricant distributing ports in the second friction device whereby temporarily a large flow of fluid is provided to said clutch plates to provide increased heat dissipation for same during engagement.

4 Claims, 2 Drawing Figures

2-3 SHIFT VALVE

ACCUMULATOR

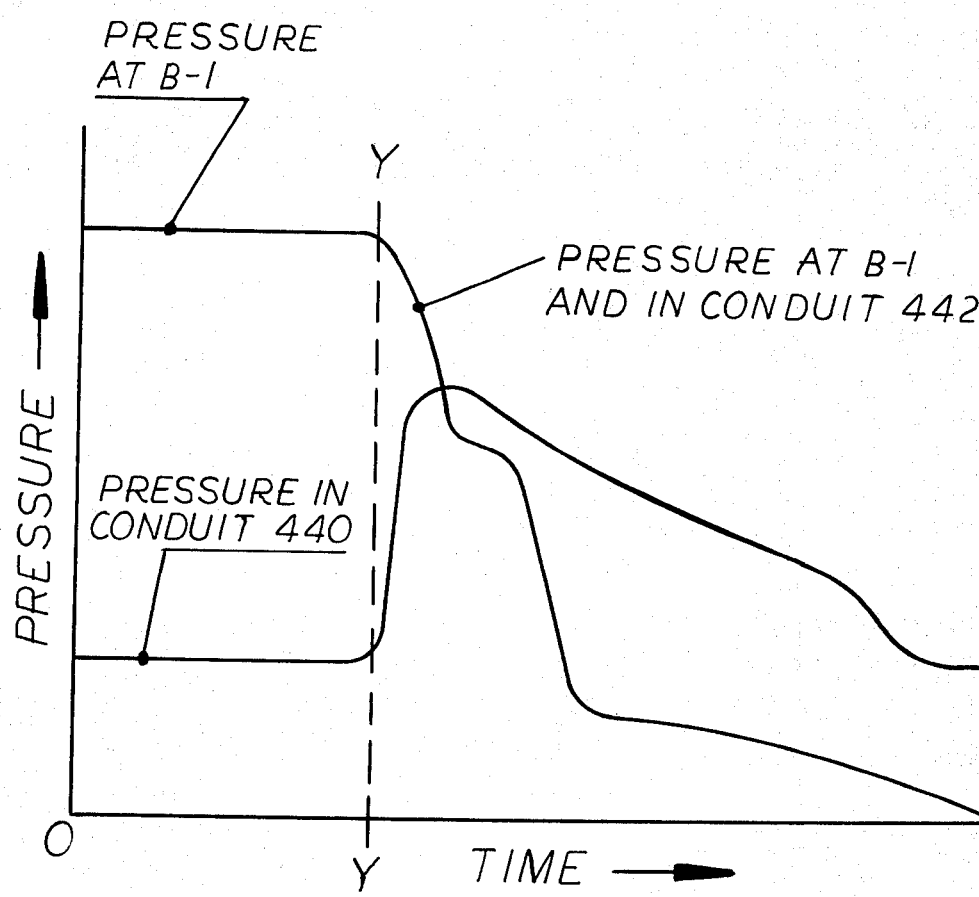

3,995,727

AUTOMATIC LUBRICANT FLOW INCREASE VALVE

SUMMARY OF THE INVENTION

In automatic transmissions, for example, where a friction clutch is utilized to establish a drive ratio, it has been found that during the engagement cycle of the clutch the maximum heat is generated and at such time scoring and overheating of the clutch plates may take place. Various devices have been developed in the prior art to attempt to solve this problem such as increasing the pressure to the lubricant passages on a continuous basis, providing a larger number of clutch plates to provide greater heat dissipation, and improved heat dissipation by grooving of the clutch plates.

The present invention solves this problem by a unique lubricant flow increase control valve which acts during a shift in the transmission in response to exhaust pressure from the friction device disengaged when the clutch is engaged to momentarily increase the pressure and flow in the lubricant line to the clutch to provide a flooding of the clutch plates with oil during engagement and thereby prevent excessive heat generation.

BRIEF DESCRIPTION OF THE DRAWINGS

FIG. 2 is a graph illustrating pressure changes induced by the unique valve of the present invention.

BRIEF DESCRIPTION OF THE PREFERRED EMBODIMENT

Figure 1:
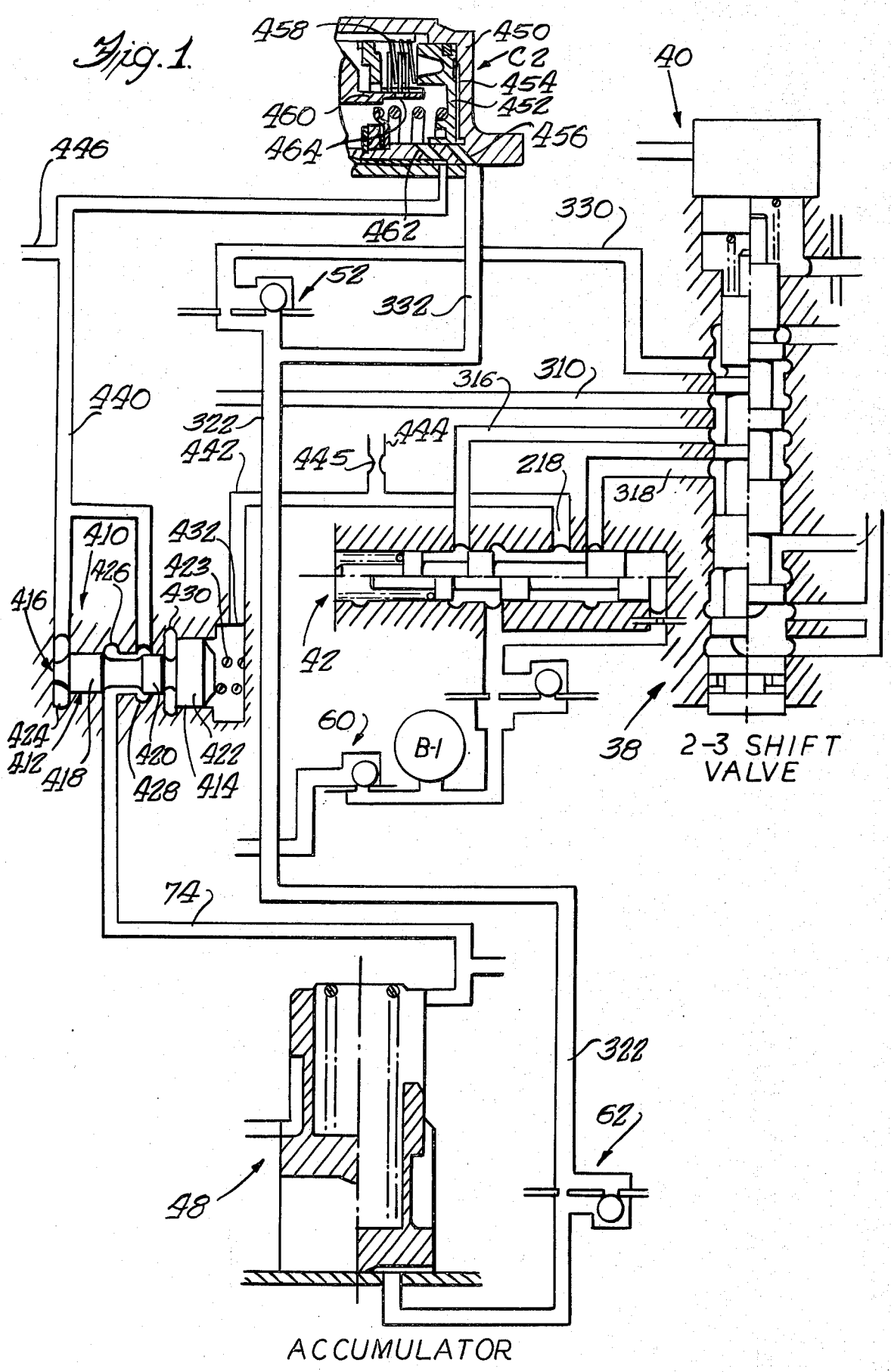
FIG. 1 is a schematic illustration of a portion of a hydraulic control system for an automatic transmission incorporating the improved valve of the present invention.

Referring to FIG. 1 it will be seen that included therein is a unique automatic lubricant flow increase valve 410. Valve 410 is shown in a hydraulic control environment which is the subject manner of pending U.S. application Ser. No. 501,926 filed Aug. 30, 1974 and now Pat. No. 3,951,355 of common assignee. The disclosure of application Ser. No. 501,926 is incorporated herein by reference and contains a more complete description of the environment in which the improved valve 410 is to be used. Certain of the numbers of the control system utilized in application Ser. No. 501,926 are repeated here to clarify an understanding of the operation of valve 410.

Referring to FIG. 1, there is shown a 2-3 shift valve 38, a friction brake mechanism B-1, an intermediate coast modulator valve 42, a logic valve 60, a restriction control valve 62, a clutch mechanism C-2, an accumulator 48 for clutch mechanism C-2 and a conduit 74 containing a source of regulated fluid pressure. In addition, conduit 310 supplies fluid pressure to the 2-3 shift valve 38, conduit 330 is a pressure supply conduit for clutch C-2 which will receive pressure from conduit 310 when the 2-3 shift valve 38 moves to its up-shifted or "3" position. Pressure conduit 322 connects clutch C-2 to accumulator 48 to soften the engagement of the clutch C-2, and conduit 332 connects conduit 330 to clutch 330 to clutch C-2 through the restriction control valve 52. Port 218 of valve 42 is adapted to receive the exhausted fluid pressure from brake B-1 when brake B-1 is to be disengaged. All of the new structure comprising the subject invention carries numbers in the "400" series so as not to confuse such structure with the numbers from application Ser. No. 501,926.

Valve 410 includes a bore 412 provided in a valve body for an automatic transmission. Bore 412 has an enlarged bore portion 414 and mounted within the bore is a valve spool 416 having two lands 418 and 420 thereon of identical size. On the right end of the valve spool 416, as illustrated in FIG. 1, is a larger land 422 received within the bore portion 414. A spring 423 is included in bore portion 414 engaging land 422 and urging valve spool 416 to the left. The valve bore 412 includes ports 424, 426, 428, 430 and 432. Ports 424 and 428 are connected to a lubricant conduit 440, port 426 is connected to the regulated source of fluid pressure conduit 74 and conduit 432 is connected by an exhaust conduit 442 to the port 218 of valve 42. Conduit 442 has a branch conduit 444 which is adapted to connect port 218 to the fluid sump which is not illustrated. A restriction 445 is provided in conduit 444. Conduit 440 is connected to the main lubricating conduit 446 for the transmission which is adapted to lubricate the clutch C-2 as illustrated in FIG. 1.

Clutch C-2 includes the rotatable housing 450, a piston 452 received within the housing and defining with the housing 450 a fluid chamber 454 adapted to receive fluid pressure. Conduit 332, as illustrated, is connected to conduit 330 by means of the valve 52. A fluid port 456 is illustrated in clutch housing 450 which is connected to the conduit 332 is adapted to supply fluid pressure to the chamber 454 to engage clutch C-2. A series of clutch plates 458 are provided within housing 450 which are adapted to be connected alternately to housing 450 and to a rotatable element 460 of the transmission. A lubricant port 462 is provided in the housing 450 which is connected to lubricant conduits 440 and 446 and is adapted to conduct lubricating fluid to the clutch plates 458. A port 464 is provided in the rotatable element 460 to guide the lubricant from port 462 to the clutch plates 458.

In general, the operation of the control system as more particularly described in application Ser. No. 501,926 is that in the second speed condition of the control system brake B-1 is engaged by pressure received from pressure conduit 310 and communicated through the 2-3 shift valve in its down-shifted or lower position as illustrated in FIG. 1. When the 2-3 shift valve moves to its up-shifted or upper position, fluid pressure from conduit 310 is connected to conduit 330 to flow through conduit 322 to accumulator 48 and conduit 332 to engage clutch C-2. At this time, fluid pressure is exhausted from brake B-1 to disengage same.

In this general environment, the unique valve 410 is added to provide for increased cooling of clutch C-2 and the operation of the valve 410 to provide this additional cooling is as follows. When brake B-1 is to be exhausted on the 2-3 shift, i.e., when clutch C-2 is to be engaged, the 2-3 shift valve moves to its upper most position as illustrated in FIG. 1 and interconnects conduits 316 and 318 such that pressure at brake B-1 is connected through valve 42 from conduit 318 to port 218 as described in copending application Ser. No. 501,926. The exhaust pressure at port 218 will flow through conduit 442 and port 432 to be imposed on large land 422 of valve 410. This will move valve 410 to its active position as illustrated in FIG. 1 in which the regulated line pressure in conduit 74 will be conducted through ports 426 and 428 into conduit 440. Pressure in conduit 440 will thus be conducted through ports 462 and 464 of clutch C-2 to provide increased lubricant flow to the clutch plates 458 as clutch C-2 is being engaged.

Thus, it can be seen that a temporary increase in lubricant flow is provided to clutch plates 458. This supply of increased flow and pressure fluid is momentary since the pressure from conduit 74 which has been added to conduit 440 is also imposed on the end of land 418 through port 424 and after a time delay will act on the valve spool 416 to move same to the right to its inactive position against the force of spring 423 blocking port 426 and interrupting the flow of additional fluid flow to lubricating conduit 440. This time delay is provided by the fact that upon exhaust of pressure from brake B-1, for a period of time a relatively high pressure will exist in conduit 442 to the action of restriction 445 keeping valve spool 416 in its active position as illustrated in FIG. 1 until such time as the pressure in conduit 442 is dissipated through restriction 445.

The time relationship of the exhaust of fluid pressure through port 218 from brake B-1 and the additional supply of lubricating flow in conduit 440 is illustrated in the graph of FIG. 2. In FIG. 2, the pressure changes in conduit 440 and the pressure at brake B-1 which will exist in port 218 and conduit 442 is illustrated. No specific values are given on the chart of FIG. 2 for time or pressure since these values may be varied depending on the transmission requirements. Beginning at time zero, it will be seen that the lubricating pressure is at its normal low level and the pressure at B-1 is at a high value holding B-1 engaged. The line Y—Y indicates the point in time at which the 2-3 shift valve moves to engage the clutch C-2 and exhaust the brake B-1 as is the case on a 2-3 shift. As shown in the chart, the pressure at brake B-1 immediately begins to drop. At the same time, due to operation on the valve 410, the pressure in lubricating conduit 440 will increase greatly as shown on the chart to provide additional flow to clutch plates 458. However, as the valve 410 is returned to its inoperative position the increase in lubricating pressure will gradually be reduced until at the right end of the time scale illustrated in FIG. 2, the lubricating pressure in conduit 440 has returned to normal.

As will be apparent, the sizes of the lands used on valve spool 416 and valve 410 may be varied to change the response of the valve and vary the time it will take the valve to move from its operative position providing increased lubricant flow to its inoperative position cutting off such increased lubricant flow. As can be seen if the size of land 418 for example, is increased relative to size of land 422 the valve 410 will tend to return to its inoperative position more rapidly than otherwise. In addition, it should be noted that the unique valve 410 can be utilized in any hydraulic control system where one friction element is to be exhausted and an additional friction element is to be engaged when making a shift. The particular environmental illustration presented is merely to show the operation of valve 410 in a specific hydraulic control environment so that those of ordinary skill in the art can easily understand how such valve operates and can be added to an existing hydraulic control system.

Rather than using valve 410 to increase lubricant pressure and flow in lubricant conduit 446 which would increase lubricant pressure and flow throughout the lubricant system for the transmission, the valve 410 can be used to supply lubricant to the clutch C-2 at all times directly. In this type of configuration, the valve 410 would be constructed identical to the valve as illustrated in FIG. 1 with the exception that land 420 would be smaller than land 418 producing a force in opposition to the force created by pressure in conduit 440 acting through port 424 on the end of land 418, to provide a construction wherein normally a regulated low pressure suitable for normal lubricating requirements would be provided from conduit 74. In this configuration conduit 440 would be connected directly to port 462 and the lubricant conduit 446 would not be connected to port 440 or conduit 440.

In such configuration, just as with the construction described above, exhaust pressure in conduit 442 will temporarily move the valve piston 416 to the left as viewed in FIG. 1, to provide full line pressure from conduit 74 in conduit 440. The construction of a valve 410 for this type operation is not specifically illustrated since it is merely a change in land size for the valve 410, or in the force produced by the spring 423, and it is deemed unnecessary to show additional figures merely to illustrate variations in land and/or spring size.

From the above it will be apparent that the present invention provides a unique and extremely advantageous means for preventing scoring and overheating of clutch plates by adding additional lubricant flow and pressure for a temporary period during engagement of the clutch plates. It is known to those in the art that it is during engagement of clutch plates that the maximum heat is generated in the clutch mechanism and the flooding of excess oil through the plates at such time is important. Connection of the main line pressure of a transmission to particular clutch plates at all times is undesirable since such a connection to flood the plates continually will create turbulence and provide additional power losses in the transmission mechanism.

Various of the features of the invention have been particularly shown and described, however, it should be obvious to one skilled in the art that various modifications may be made therein without departing from the scope of the invention.

I claim:

1. In a control system for an automatic transmission which includes a source of regulated fluid pressure, shift valve means adapted to change ratio in the transmission mechanism by exhausting a first friction device of pressure and engaging a second friction device by supplying pressure thereto, lubricant valve means connected to said shift valve means and to said regulated source of pressure, said second friction device having lubricant distributing means adapted to conduct lubricating oil to the friction plates in said device, said lubricant valve means also being connected to said lubricant distributing means, an exhaust conduit for exhausting fluid pressure from said first friction device, said lubricant valve being connected to said exhaust conduit whereby when pressure is exhausted through said exhaust conduit as initiated by said shift valve means when said second friction device is to be engaged, the initial high value of pressure in said exhaust conduit acting on said lubricant valve means to move same to a position to connect said source of regulated pressure momentarily to said lubricant distributing means whereby temporarily an increased flow of fluid is provided to said clutch plates to provide increased lubricant flow for said clutch plates during engagement of same.

2. A hydraulic control mechanism as claimed in claim 1 wherein the source of regulated fluid pressure is connected to said lubricant valve means such that the lubricant valve means will move to a position to interrupt said flow to said clutch means after an initial time delay.

3. A hydraulic control system as claimed in claim 1 wherein said lubricant valve means has a large area land thereon connected to said exhaust conduit by means of which fluid pressure in said exhaust conduit will move said lubricant valve means to its position connecting the source of pressure to said friction device.

4. A hydraulic control system as claimed in claim 3 wherein said source of regulated pressure in the operative position of said lubricant valve means is also connected to a smaller land on the opposite end of said lubricant valve means to return said lubricant valve to its inoperative position.

* * * * *